United States Patent [19]

Yasuda

[11] 4,010,335

[45] Mar. 1, 1977

[54] MICROPHONE APPARATUS

[75] Inventor: Hiroshi Yasuda, Yokohama, Japan

[73] Assignee: Sony Corporation, Tokyo, Japan

[22] Filed: Oct. 24, 1975

[21] Appl. No.: 625,504

[30] Foreign Application Priority Data

Oct. 31, 1974 Japan ............................ 49-125873

[52] U.S. Cl. ............................ 179/156 R; 179/1 G; 179/182 R

[51] Int. Cl.[2] ...................... H04R 1/02; H04M 1/05

[58] Field of Search ........... 179/182 R, 179, 121 R, 179/178, 121 P, 107 E, 1 G

[56] References Cited

UNITED STATES PATENTS

| | | | |
|---|---|---|---|
| 1,624,486 | 4/1927 | Fletcher et al. | 179/1 G |
| 2,361,458 | 10/1944 | Converse | 179/121 R |
| 2,814,677 | 11/1957 | Bleazey | 179/121 D |
| 3,969,583 | 7/1976 | Griese et al. | 179/1 G |

*Primary Examiner*—William C. Cooper

*Attorney, Agent, or Firm*—Hill, Gross, Simpson, Van Santen, Steadman, Chiara & Simpson

[57] ABSTRACT

A microphone assembly or apparatus comprises a perforated capsule having a microphone unit supported therein and a tubular projection communicating with the interior of the capsule. The projection is arranged to be inserted into the auditory canal of a human or dummy head. The microphone unit is located near the opening of the auditory canal.

6 Claims, 5 Drawing Figures

MICROPHONE APPARATUS

BACKGROUND OF THE INVENTION

1. Field of the Invention

The present invention relates generally to a microphone apparatus, and is directed more particularly to a microphone apparatus for binaural sound pickup used in dummy head recording or the like.

2. Description of the Prior Art

Upon reproducing acoustic or sound information signals, the acoustic reproducing system has hitherto been variously changed from monaural system to stereo system, to four-channel system and further to multi-channel system for the purpose of providing more faithful acoustic reproduction relative to the original sound field. Further, for the above purpose, not only one microphone, but also a number of microphones have been used to establish a multi-microphone system in which the outputs thereof are properly mixed and transmitted through a required number of channels.

In these systems, however, the original sound field has to be reproduced in, for example, the listening room of a listener, and this listening room must be wide to some extent. It is noted, on the other hand, that based upon the fact that we generally use our ears to recognize the direction from which sound signals arrive and the distance from the sound sources whether they are in front or back, right or left, or upper or lower directions, it is conceived that the necessary and sufficient information transmission can be attained by producing acoustic information signals which correspond to what the two ears of a listener in the original sound field would have actually listened to. According to this idea, only a transmission system is required by which the acoustic information provided in the eardrums of the listener in the original sound field is again produced in the eardrums of the listener in the reproducing room. In this case, the reproducing room can be selected quite freely. Besides, it is sufficient if the transmission system has two channels. Such a two-channel system is very low in cost and the reproduction of acoustic information, as good as the conventional multi-channel system, becomes possible.

It is understood that experiments of a binaural stereo system along the aforesaid lines were carried out in the year 1930 by the Bell Telephone Laboratories. In this case, satisfactory reliable results were achieved on account of the performance of sound pickup microphones, reproducing headphones and the like.

There has been proposed a microphone apparatus suitable for sound pickup to satisfy the above condition. A prior art stereo microphone apparatus of this kind has a dummy head ordinarily made of silicon robber or the like, and has a pair of symmetric microphone units, each mounted at a position of the inlet to auditory canal of the dummy head or eardrum thereof. This microphone apparatus is designed so that a condition from a sound source to the inlet of the microphone may become as much as possible, close to a condition of actual human ears. However, since the size of the microphone apparatus is fixed and constant, if there is a difference between the shape and size of the dummy head and those of a listener's head, it is not always expected to achieve the sound reproduction with good results. In addition, the aforesaid microphone apparatus is expensive, and also large in volume and heavy in weight, with the result that its transportation is rather inconvenient.

In order to eliminate the aforesaid drawbacks, it has been proposed that the following microphone apparatus be used; namely, that is, the microphone apparatus comprise an arc-shaped resilient tube, a pair of microphone units attached to the opposite ends of the tube, and supporting members mounted to the pair of microphone units. Each of the supporting members serves to locate the sound inlet of the microphone to position near the orifice of the auditory canal. An output cord is led out from the center of the resilient tube, and the microphone apparatus is formed in the shape of a stethoscope.

This microphone apparatus is normally used in such a manner that it is directly mounted on human ears or located on a dummy head having no microphone. This type of microphone apparatus greatly improves the above mentioned defects, but still has the drawbacks such that it easily picks up a wind noise and is low in stability when it is mounted on the human ears.

SUMMARY OF THE INVENTION

According to an aspect of the present invention, there is provided a microphone apparatus which has a capsule having a plurality of apertures, a projection attached to the capsule and a microphone unit supported in said capsule.

It is an object of the present invention to provide a novel microphone apparatus free from the drawbacks inherent in the prior art.

It is another object of the invention to provide a microphone apparatus in which a capsule with apertures for sound pickup has a projection to be inserted into an auditory canal and a microphone unit therein, and which is easy in manufacture.

It is a further object of the invention to provide a microphone apparatus which can be easily attached to an ear (mainly a human ear but a dummy ear may be possible), with the help of its insertion projection.

It is a further object of the invention to provide a microphone apparatus which employs a windscreen as its capsule with apertures to avoid its microphone unit picking up a wind noise.

It is a further object of the invention to provide a microphone apparatus which has formed therein a through-bore through the projection attached to its capsule and to thus make it possible to monitor an external sound.

It is a further object of the invention to provide a microphone apparatus in which a circuit for compensating the output characteristics of a microphone unit is provided to remove the positional information of a sound reproduction device and hence make it possible to produce an acoustic signal which can achieve an ideal sound reproduction.

It is yet further object of the invention to provide a microphone apparatus which may produce an acoustic signal to reproduce a natural reproducing sound field upon a speaker reproduction.

The other objects, features and advantages of the present invention will become apparent from the following description taken in conjunction with the accompanying drawings.

DESCRIPTION OF THE PREFERRED EMBODIMENT

An embodiment of the microphone apparatus according to the present invention will be hereinafter described with reference to the drawings.

Figure 1:
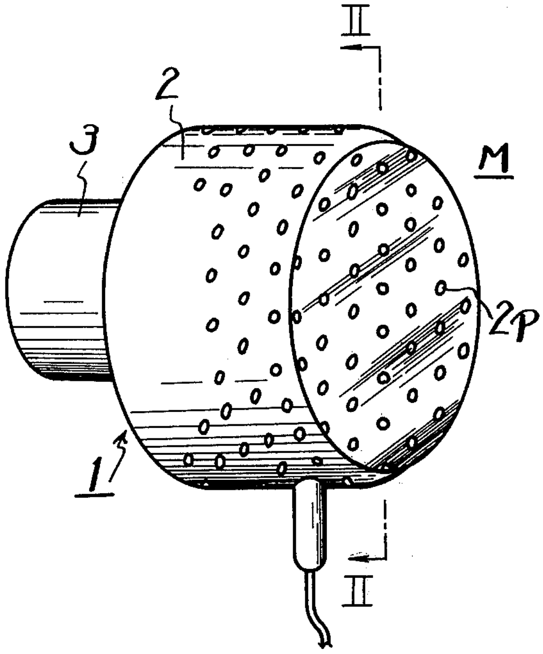
FIG. 1 is a perspective view showing an embodiment of the microphone apparatus according to the present invention.
Figure 2:
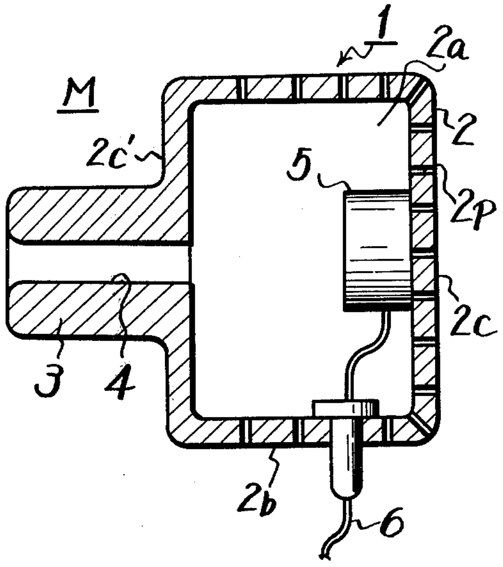
FIG. 2 is a cross-sectional view taken on the line II—II in FIG. 1.

FIG. 1 shows an embodiment of the microphone apparatus of the invention, and FIG. 2 is a cross-sectional view on the line II—II in FIG. 1. In the figures, reference letter M generally designates the microphone apparatus which has a housing 1. The housing 1 consists of a capsule 2 for picking up a sound, which capsule is large in diameter and has a projection 3 for insertion into an auditory canal which is small in diameter and connected to the capsule 2 on its end wall 2*c*. The capsule 2 is of cylindrical shape, consists of a peripheral wall 2*b* and end walls 2*c*, 2*c'*, and a cavity 2*a*, as clearly shown in FIG. 2. A number of apertures 2*p* are bored through the peripheral and end walls 2*b* and 2*c* to permit the passage of external sound waves therethrough into the cavity 2*a*. The projection 3, which is arranged to be inserted into the auditory canal, is also of cylindrical shape and has bore 4 therethrough, which communicates with the cavity 2*a* of the capsule 2, so as to enable the monitoring of the external sound wave by a user. The projection 3 and the capsule 2 are integrally made of plastics by molding to form the housing 1.

As shown in FIG. 2, a microphone unit 5 is fixed in the capsule 2, as shown. An omnidirectional microphone is preferred as the microphone unit 5. A cord 6 is led out from the microphone unit 5 through the housing 1 to the outside thereof.

A part or all of the capsule 2 having the apertures 2*a* may be made of a windscreen such as metal mesh, plastic mesh or the like. Further, it is not necessary always to provide the aperture 4 through the projection 3.

In practice, two of the microphone apparatus M are used at the same time. Upon using the microphone apparatus M, their projections 3 are inserted into the auditory canals of both of the user's ears, and then the microphone apparatus M is fixed thereto. An external sound wave arrives at the cavity 2*a* of the capsule 2 through its apertures 2*p*, and then picked up by the microphone unit 5. In this case, if the aperture 4 is formed through the projection 3, the external sound wave can arrive at the user's eardrum through the aperture 4, and hence he can monitor the external sound wave simultaneously.

Figure 3:
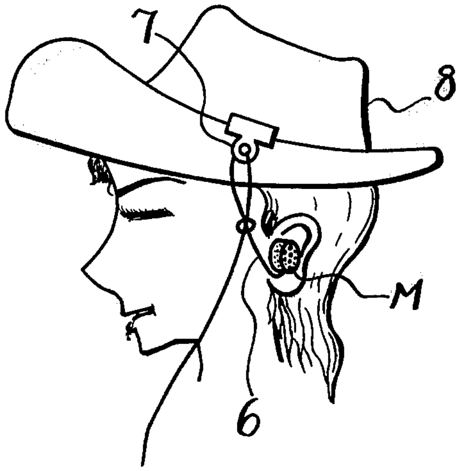
FIG. 3 is a side view used for explaining a manner of mounting the microphone apparatus shown in FIG. 1.

When there may be a fear that a contact noise may be caused by the contact of the cord 6 with the user's skin, a clip 7 is fixed, for example, at a user's hat 8 (or the temple of his spectacle) and the cord 6 is fixed through the bore of the clip 7, as shown in FIG. 3. Thus, the contact of the cord 6 with the user's skin is avoided, and, hence no contact noise is picked up by the microphone apparatus M.

Though not shown, when a dummy head is employed, the microphone apparatus M is fixed to the dummy head by means of the projection 3, similar to the aforesaid case.

With the present invention, since a number of apertures 2*p* are formed through the capsule 2 and the microphone unit 5 is fixed in the capsule 2, the capsule 2 serves as a windscreen to avoid the entrance of wind sound to the user's ear. Further, an external sound can be monitored through the aperture 4. In addition, since the housing 1 has a larger diameter portion, the microphone unit 5 can be easily accommodated in the housing 1 at the larger diameter portion.

Figure 4:
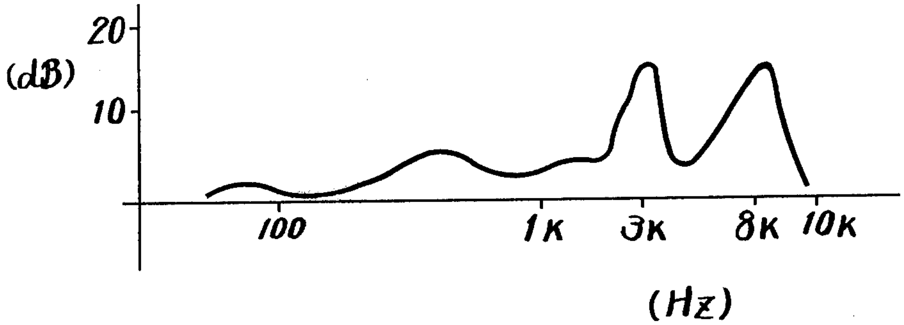
FIG. 4 is a graph showing the frequency characteristics of sound pressure appearing in both the listener's ears caused by a sound arriving at the listener from his front.

As described above, with the binaural microphone apparatus comprising a pair of microphone units which are disposed near the opening of auditory canals of both human ears or disposed near the opening of auditory canals of dummy pinnas when the dummy head having dummy ears or pinnas is used, the frequency characteristic of a sound signal obtained from the above apparatus is normally not flat. A pair of microphone units disposed in the vicinity of the inlets of auditory canals of both human ears pick up a sound from a sound source located in the front thereof to produce a sound signal having a frequency characteristic such as shown in FIG. 4, in which the ordinate represents the level in dB and the abscissa the frequency in Hz. In this frequency characteristic, there are two peak values in level at frequencies near 3 KHz and 8 KHz, but this frequency characteristic is varied according to individual difference. This frequency characteristic makes a contribution to recognition of the oncoming direction of an acoustic information and the distance of a source of the acoustic information. In other words, the positional relation of the sound source to the listener's ears equally corresponds with the variation of frequency characteristic. Therefore, the above corresponding relationship is required to be correctly reproduced in order to properly reproduce the original sound field. However, when this reproduction is carried out through a reproducing apparatus, not only the frequency characteristic of the reproducing apparatus, but also its positional information. That is, the frequency characteristic produced in ears by the positional relation of the reproducing apparatus to ears must be eliminated by compensation. In the case of using a normal headphone, the frequency characteristic as shown in FIG. 4 is positively utilized for avoiding the localization of reproduced sound at the back of the head upon reproducing a stereo acoustic signal picked up by the prior art stereo sound pickup system, so that this frequency characteristic is required to be removed by compensation. Further, when the binaural sound signal, picked up as above, is reproduced through loudspeakers, front localization information comes to be given twice, so that the front localization information for a picked up sound signal is eliminated and hence the reproduced sound by loudspeakers can be enjoyed under the same conditions as that of the prior art stereo sound.

Figure 5:
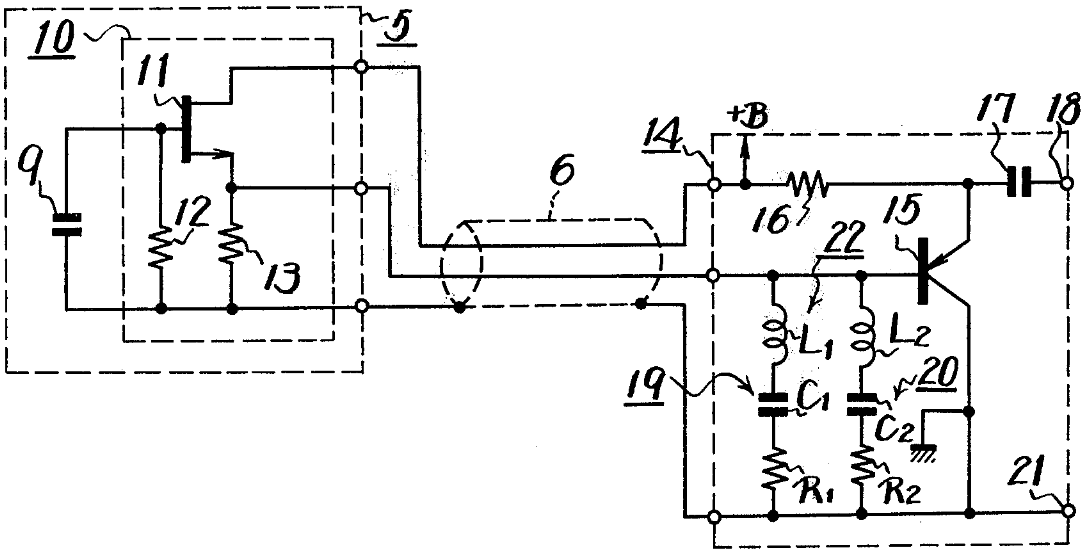
FIG. 5 is a connection diagram showing a frequency characteristic compensation circuit which is a part of the microphone apparatus of the invention.

Referring to FIG. 5, a description will next be given on the microphone unit 5 and a microphone amplifier 14 by which the above mentioned compensation is accomplished.

The microphone unit 5 consists of an electret condenser microphone capsule 9 and its pre-amplifier 10. The pre-amplifier 10 is composed of a field effect transistor 11, a resistor 12 connected in parallel with the capsule 9, and a load resistor 13 connected to the source electrode of the transistor 11. The amplifier 14 is connected through a two-core shielded cord 6 to the microphone unit 5. The amplifier 14 includes an amplifying transistor 15, the emitter electrode of which is connected through a load resistor 16 to a power supply source +B. The power supply source +B is connected through the cord 6 to the drain electrode of the transistor 11 in the pre-amplifier 10. The emitter electrode of the transistor 15 is further connected through a capacitor 17 to an output terminal 18, while the base electrode of the transistor 15 is connected through the cord 6 to the source electrode of the transistor 11 in the pre-amplifier 10. The collector electrode of the transistor 15 is grounded and also connected to an output terminal 21 of the amplifier 14 and to the pre-amplifier 10.

The amplifier 14 is provided with a frequency characteristic compensating circuit 22 by which the frequency characteristic of a sound signal derived from the binaural microphone apparatus M is compensated to be a flat characteristic. The frequency characteristic compensating circuit 22 consists of a first trap circuit 19 having a resonance frequency of, for example, 3 KHz and a second trap circuit 20 having a resonance frequency of 8 KHz, which are respectively connected between the base electrode of the transistor 15 and ground. The first trap circuit 19 consists of a series resonance circuit of coil $L_1$, capacitor $C_1$ and resistor $R_1$ and the second trap circuit 20 consists of a series resonance circuit of coil $L_2$, capacitor $C_2$ and resistor $R_2$, respectively.

The above described frequency characteristic is compensated for by these trap circuits 19 and 20 and hence the sound pickup suitable for the reproductions by a headphone and by loudspeakers can be achieved.

Further, more faithful sound reproduction in response to individual case can be achieved by slightly changing the center frequency of the resonance circuit.

It will be apparent that the microphone apparatus of the invention is not limited to the aforesaid embodiment, but a number of changes and variations can be effected by one skilled in the art without departing from the spirit or scope of the novel concepts of this invention.

I claim as my invention:

1. A microphone assembly comprising:

a. a housing consisting of a capsule and a projection extending from said capsule;

b. a cavity formed in said capsule;

c. a plurality of apertures bored through said capsule;

d. a microphone unit supported in said capsule, and being positioned in said cavity so as to communicate with the outside of said housing through said apertures; and e. said projection being arranged to be inserted into the auditory canal and having a bore therethrough which communicates with said cavity.

2. A microphone assembly as claimed in claim 1, wherein said capsule is a windscreen.

3. A microphone assembly as claimed in claim 1, further including an amplifier having an active element for amplifying an output of said microphone unit, and wherein said amplifier includes a frequency characteristic compensating circuit for leveling the frequency characteristic of an output signal from said microphone unit.

4. A microphone assembly as claimed in claim 3, wherein said frequency characteristic compensating circuit is connected to said active element and includes at least two trap circuits.

5. A microphone assembly as claimed in claim 4, in which said two trap circuits are two series resonant circuits, one of said resonant circuits being resonant at approximately 3 KHz, and the other being resonant at approximately 8 KHz.

6. A microphone assembly comprising:

a. a housing consisting a larger diameter portion and a smaller diameter portion extended from said larger diameter portion and being arranged to be inserted into the auditory canal;

b. a cavity formed in said larger diameter portion;

c. a plurality of apertures bored through said larger diameter portion;

d. a microphone unit attached to said housing to be positioned in said cavity; and e. a bore formed in said smaller diameter portion and communicating with said cavity.

* * * * *